May 17, 1938.　　　　H. ALLEN　　　　2,117,783
PIPE HOLDING DEVICE
Filed Jan. 14, 1937　　　2 Sheets-Sheet 1
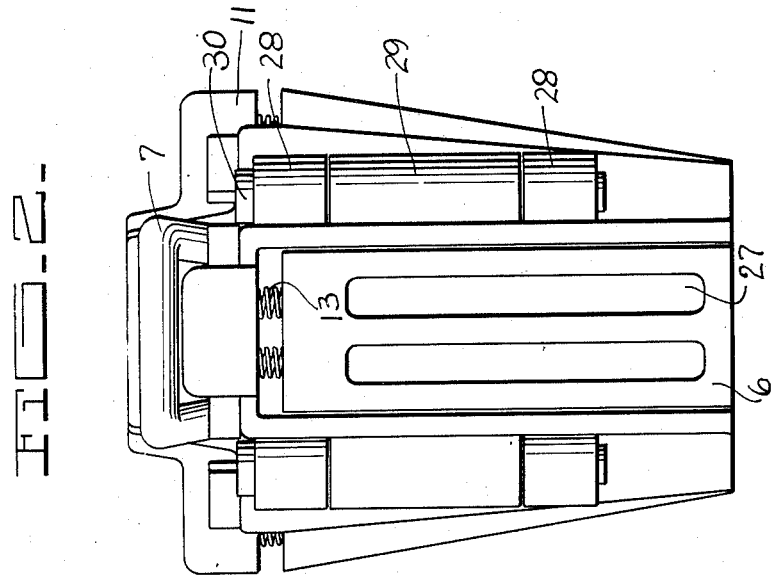
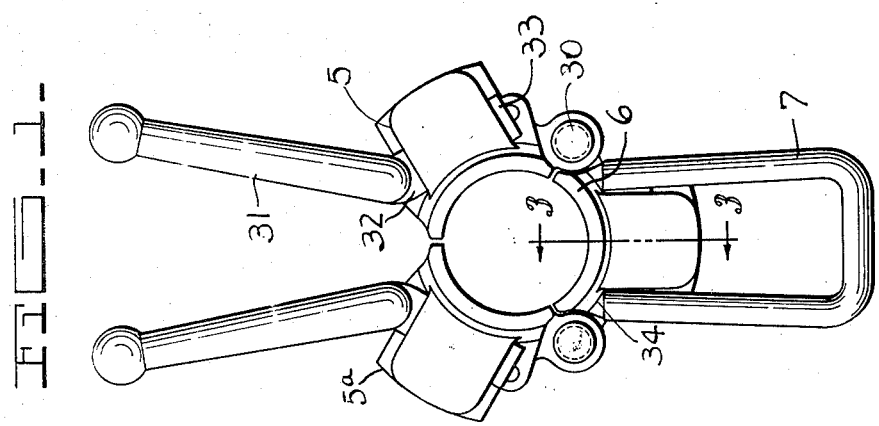
Herbert Allen INVENTOR.
BY
ATTORNEYS

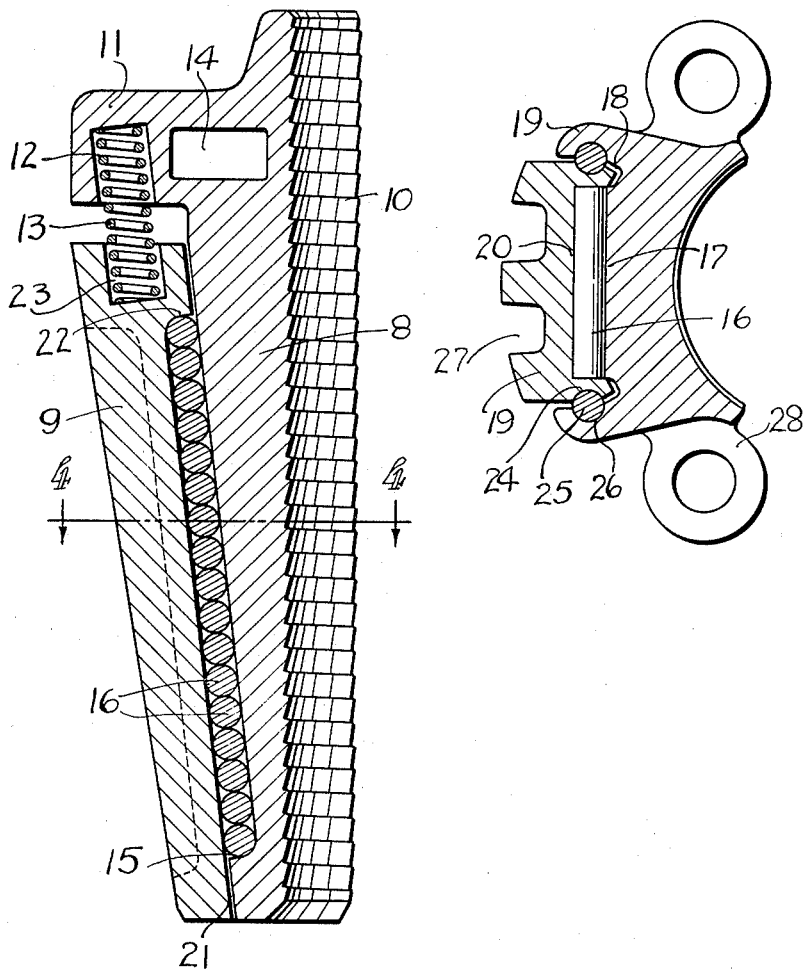

Patented May 17, 1938

2,117,783

UNITED STATES PATENT OFFICE 2,117,783

PIPE HOLDING DEVICE

Herbert Allen, Houston, Tex., assignor to Abercrombie Pump Company, Houston, Tex., a corporation Application January 14, 1937, Serial No. 120,497

9 Claims. (Cl. 24—263)

My invention relates to devices for holding pipe and is adapted to be placed within a tapered bowl or bushing seated within the ordinary rotary table, casinghead or the like.

Devices of this character are in general use. The difficulty arising in the operation of such devices is the tendency of the jaws of the pipe holding device to adhere or stick to the walls of the tapered bowl and fail to release when the pipe is drawn upwardly.

It is an object of my invention to provide a jaw structure which is adapted to easily release the pipe when the pipe is moved upwardly relative to the slip jaws.

It is another object to provide a slip jaw of this character which will engage with the pipe uniformly throughout its length so that the tendency to deform or crush the pipe will be greatly decreased.

It is a further object to provide effective means for holding the pipe engaging jaws together so that they may be easily handled in moving them to or from their pipe engaging position.

It is a further object to provide a slip jaw construction which is automatically adjusted to normal position when the device is removed from bowl.

Devices of this general character are well known and no disclosure of the downwardly tapered bowl in which the jaws are to fit has been shown, it being understood that this structure is so well known that no further disclosure thereof is necessary.

In the drawings herewith Fig. 1 is a top plan view of an assembly embodying my invention.

Fig. 2 is a side elevation of said assembly.

Fig. 3 is a longitudinal section through one of the slip jaws taken on the plane 3—3 of Fig. 1.

Fig. 4 is a transverse section on the plane 4—4 of Fig. 3.

In constructing a pipe holding assembly to completely surround the pipe I contemplate using a plurality of jaws arcuate in shape which together completely enclose the pipe. In the particular embodiment of the invention here shown I have illustrated three jaws thus held together, it being understood, however, that a larger number of jaws may be employed if desired.

As will be seen from Fig. 1, there are two jaws 5 and 5a which are identical in construction. The third jaw 6 is similar in general construction but is attached to the adjacent jaws in a slightly different manner and has a different operating handle 7 thereon. Referring particularly to the jaw 6, a central longitudinal section of this jaw will be seen in Fig. 3. It includes two adjacent vertical sections, an inner pipe engaging section 8, and an outer bowl engaging section 9. The inner pipe engaging section 8 is toothed at 10 in the usual manner, the teeth being inclined upwardly so as to better resist the downward movement of the pipe relative thereto. The inner surface can be extended upwardly beyond the body of the slip so as to form an elongated contact with the pipe and to distribute the load of the pipe over a long surface. Adjacent the upper end of the slip the body of the jaw 8 is extended outwardly to form a flange 11. The underside of the flange is recessed at 12 to receive springs 13. Extending transversely through each of the jaws adjacent this flange are openings 14 to receive the handle, as will be later described.

The outer surface of the inner section 8 is tapered downwardly at the same angle as is the tapered bowl in which the device is adapted to seat. The outer surface of the section 8 is extended outwardly at its lower end to form a shoulder at 15 presented upwardly to support a series of rollers 16 thereon.

The rollers 16, as will be seen from Fig. 4, extend short of the sides of the jaw and form an anti-friction bearing between the inner section 8 and the outer section 9. With reference to Fig. 4 it will be seen that adjacent each end of the flattened surface 17 upon which the rollers 16 may roll, the outer surface of the jaw 8 is slightly recessed at 18 and beyond this recess the jaws extend rearwardly at 19 to interfit with the outer section which is narrower in width.

The outer section 9 is recessed on its inner surface at 20 to bear against the rollers 16. At its lower end it seats at 21 against the outer surface of the inner section. Above the shoulder 15 the outer section bears against the rollers 16. There is an inwardly projecting shoulder 22 on the outer section which engages above the rollers 16 and thus supports the outer section relative to the inner one. Springs 13 fit within recesses 23 in the upper end of the section 9 and tends to hold this section downwardly seated upon the row of rollers 16.

To prevent the movement outwardly of the section 9 away from the section 8, I provide at each side of the outer section a semi-cylindrical recess 24 to receive a rod 25, said rod fitting also in a similar recess 26 in the inner wall of the projection 19 on the inner jaw. It will be understood that when the pins or rods 25 are inserted into the recesses 24 and 26, the two sections of the jaw will be held against relative lateral movement.

The outer surface of section 9 is shown as provided with longitudinal recesses 27 which tend to make the jaw lighter and also provides a somewhat smaller contacting surface between the jaw and the bowl.

At the sides of the sectional jaw which has been described are two laterally extending eyelets 28. There are two pairs of eyelets, one pair adjacent the upper end and a second pair placed downwardly therefrom, as will be seen from Fig. 2. These eyelets serve as a connection between the central jaw 6 and the two jaws 5 and 5a.

The two jaws 5 and 5a are formed in the same manner as is the jaw 6 just described. They each have one elongated eyelet or sleeve 29 which fits between the two eyelets 28 on the central jaw, and a hinge is thus formed between the adjacent jaws by inserting a pin 30 downwardly through the three eyelets, as will be clearly seen from Fig. 2. This is obviously a common form of hinge.

The two jaws 5 and 5a are each formed with laterally extending handles 31. As will be best seen from Fig. 1 these handles diverge slightly in an outward direction but on their inner ends they are formed with a flat plate 32 which fits through the opening 14, shown in Fig. 3, the end projecting through said opening at 33. The connection of the handle with the plate is secured by means of welding or similar means of attachment so that the handles are fixed rigidly to the inner section 8 of each jaw.

The jaw 6 has a similar connection with a U-shaped handle 7, the inner end of which is extended through an opening at the sides of the jaw and is shown at 14 in Fig. 3.

The handles 31 may be employed to swing the two jaws 5 and 5a apart so that they may be fitted about the pipe and dropped downwardly into the bowl. When the jaw is seated in the bowl a pipe extending downwardly therethrough will be engaged by the teeth 10 on the inner section of the jaw. The weight of the pipe resting on the inner section will tend to move that section downwardly and the friction of the outer section with the bowl will retard its movement and allow a downward movement of a limited measure of the inner section relative to the outer section. In this relative movement the rollers 16 will give little resistance to the downward settling of the section 8 relative to the outer section and the inner section will thus engage uniformly with the outer surface of the pipe and adjust itself thereto. The outer section engaging the bowl will have a greater frictional resistance to downward movement and allow the inner sections to take a position somewhat lower relative to the outer section than is shown in Fig. 5, this movement being limited, however, by the distance between the upper end of the outer section 9 and the lower shoulder of the flange 11.

This relative movement of the two jaw sections not only allows a better engagement of the jaw with the pipe but permits a ready release of the jaw from the pipe when the pipe is later drawn upwardly relative to the slip. This upward movement of the pipe will move the inner section 8 upwardly and little resistance will be offered to this upward movement due to the anti-friction quality of the rollers 16. When a slight upward movement has taken place of the inner jaw, the wedge effect of the slip between the pipe and the bowl will be released and the two sections of the jaw will both release their hold relative to the pipe and the bowl, and the slip may be readily removed.

The advantages of this construction lie in the better engagement of the jaw with the pipe so as to reduce the wear upon the pipe to a minimum and the further advantages that the pipe is easily released when it is withdrawn and no seizing of the slip with the pipe or the bowl will occur. It will also be obvious that the two sections of the jaw may be readily separated when any repairs or replacements are necessary by simply withdrawing the pins 25 which hold the two sections together. The device is thus simple and strong in construction and efficient in its engagement with the pipe.

What I claim as new is:

1. A pipe holding device adapted to fit within a downwardly tapered bowl and engage a pipe, including a plurality of jaws, each jaw comprising an inner pipe engaging section and an outer bowl engaging section, the adjacent faces of said sections having parallel flat bottomed recesses, a plurality of rollers in said recesses furnishing an anti-friction bearing between the sections and means holding said sections together for simultaneous movement to and from said bowl and permitting a relative longitudinal movement between them.

2. A pipe holding device adapted to fit within a downwardly tapered bowl and engage a pipe, including a plurality of jaws each jaw comprising an inner pipe engaging section and an outer bowl engaging section, said sections being movable as a unit to and from said bowl, the adjacent faces of said sections having parallel flat bottomed recesses, a plurality of rollers in said recesses furnishing an anti-friction bearing between the sections and pins fitting slidably within opposed longitudinal recesses in said sections to prevent relative radial movement of said sections.

3. A pipe holding device formed to fit within a downwardly tapered bowl about a pipe, including a plurality of jaws hinged together, each jaw including an inner pipe engaging section and an outer bowl engaging section, means to hold said sections together for simultaneous movement to and from said bowl but permitting a limited relative longitudinal movement, and a row of transversely positioned rollers between the adjacent faces of said sections to form an anti-friction bearing between them.

4. A pipe holding device formed to fit within a downwardly tapered bowl about a pipe, including a plurality of jaws hinged together, each jaw including an inner pipe engaging section and an outer bowl engaging section, means to hold said sections together for simultaneous movement to and from said bowl but permitting a limited relative longitudinal movement, and an anti-friction bearing between said sections to facilitate downward movement of said inner section relative to the outer one when the pipe is engaged.

5. A pipe holding device formed to fit within a downwardly tapered bowl about a pipe, including a plurality of jaws hinged together, each jaw including an inner pipe engaging section and an outer bowl engaging section, means to hold said sections together but permitting a limited relative longitudinal movement, springs holding said outer section downwardly upon said inner section, and a row of transversely positioned rollers between the adjacent faces of said sections to form an anti-friction bearing between them.

6. A pipe engaging slip jaw including an inner toothed section adapted to engage the pipe, said section having an outwardly extending radial flange at its upper end and a roller supporting shoulder at its lower end, an outer bowl engaging section spaced beneath said flange, said outer section having an inner shoulder at its upper end, a row of rollers between the shoulders on said sections, and means to hold said sections slidably together.

7. A pipe engaging slip jaw including an inner toothed section adapted to engage the pipe, said section having an outwardly extending radial flange at its upper end and a roller supporting shoulder at its lower end, an outer bowl engaging section spaced beneath said flange, said outer section having an inner shoulder at its upper end, a row of rollers between the shoulders on said sections, a spring between said flange and the upper end of said outer section, and means to hold said sections slidably together.

8. A pipe engaging slip including an inner pipe engaging section, and an outer bowl engaging section of shorter length than said inner section, anti-friction rollers between said sections acting as a support for said outer section upon said inner section, but permitting a limited relative downward movement of said inner section, and means to hold said sections slidably together, said sections being movable as a unit to and from pipe engaging position.

9. A pipe engaging jaw made up of an inner section and an outer section, means to hold said sections slidably together, means to limit the sliding of one section relative to the other, and anti-friction means between said sections to facilitate said sliding.

HERBERT ALLEN.